C. A. LATHAM & O. BENTON.
AUTOMOBILE.
APPLICATION FILED JUNE 18, 1910.
1,058,309.
Patented Apr. 8, 1913.
2 SHEETS—SHEET 1.
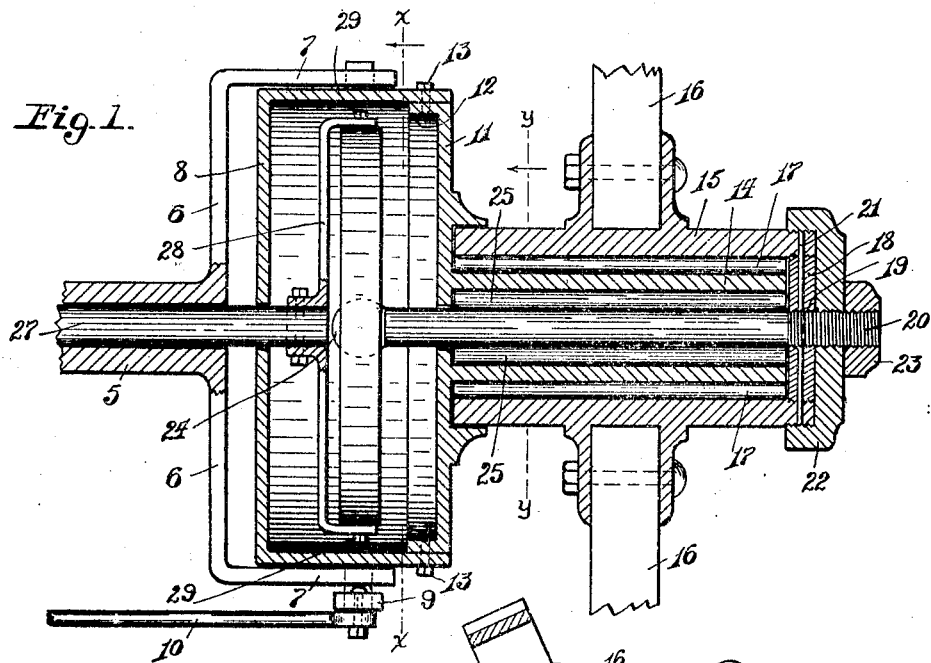
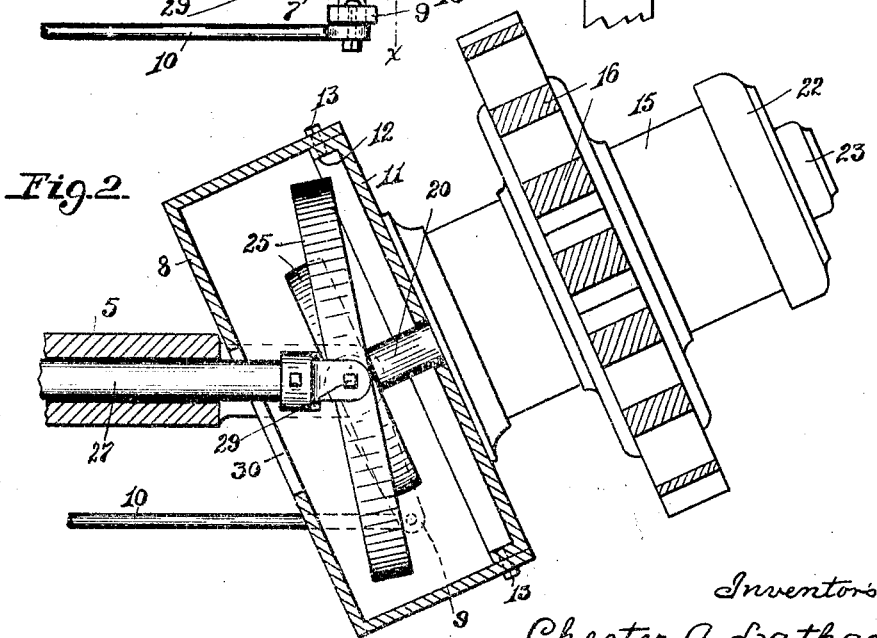
Witnesses:
Inventors.
Chester A. Latham.
Orrin Benton.
By George J. Oltsch.
Attorney.

C. A. LATHAM & O. BENTON.
AUTOMOBILE.
APPLICATION FILED JUNE 18, 1910.

1,058,309.

Patented Apr. 8, 1913.

2 SHEETS—SHEET 2.

Witnesses:
G. M. Cole
M. M. Sabernie

Inventors:
Chester A. Latham
Orrin Benton
By George J. Oltsch
Attorney

UNITED STATES PATENT OFFICE.

CHESTER A. LATHAM AND ORRIN BENTON, OF WICHITA, KANSAS.

AUTOMOBILE.

1,058,309.

Specification of Letters Patent.

Patented Apr. 8, 1913.

Application filed June 18, 1910. Serial No. 567,725.

*To all whom it may concern:*

Be it known that we, CHESTER A. LATHAM and ORRIN BENTON, citizens of the United States, residing at Wichita, in the county of Sedgwick and State of Kansas, have invented certain new and useful Improvements in Automobiles, of which the following is a specification.

Our invention relates to improvements in the front running gear for automobiles and other vehicles in which the traction wheels are positively driven by a power shaft, and in which the wheels are at the same time so mounted as to permit turning thereof for steering purposes.

One of the objects of our invention is to provide a steering head with a removable portion, said removable portion carrying an auxiliary axle.

A still further object of our invention is to provide a hollow steering head or casing provided with a removable closure, preferably at its outer end, said closure carrying the auxiliary axle and being adapted for ready removal so that access can be had to the universal coupling.

With these and other objects, the invention consists in certain new and novel features of construction as hereinafter described and specifically pointed out in the claims.

Figure 3:
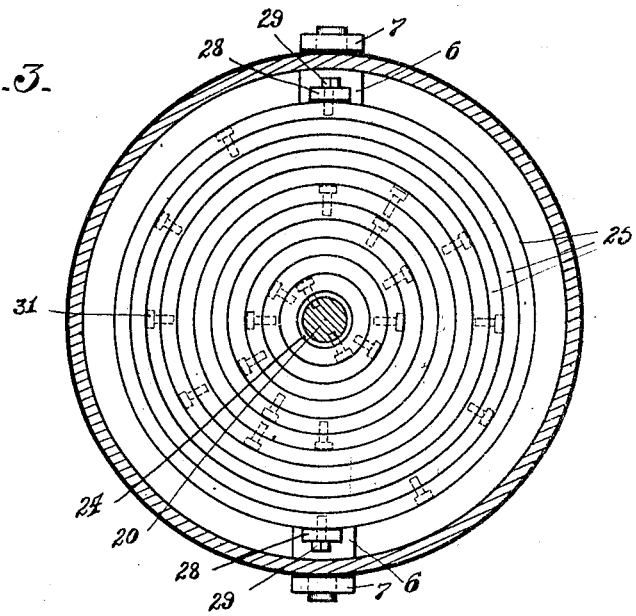
Figure 4:
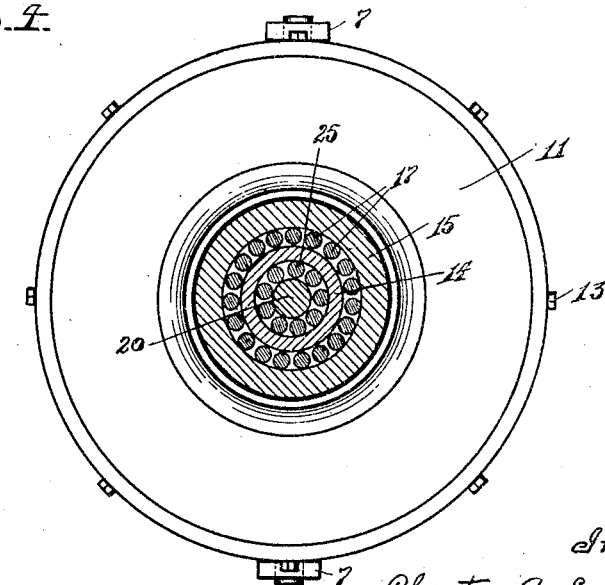

In the drawings employed for illustrating the embodiment of the invention:—Figure 1 is a vertical sectional view taken through the center thereof. Fig. 2 is a top view, partly in section, with the driving means in position shown in Fig. 1. Fig. 3 is a sectional view on the line $x$—$x$ of Fig. 1, showing the universal coupling connecting the driving and driven shafts; and, Fig. 4 is a sectional view taken on a line $y$—$y$ of Fig. 1.

Referring now more particularly to the accompanying drawings, the reference character 5 indicates a stationary hollow axle, upon which a vehicle body may be mounted in any suitable manner, the opposite end of which, as well as the remaining structure illustrated, being the same. Preferably formed integral with the hollow axle 5 and extending from the end thereof in opposite directions are arms 6, which are deflected to form spaced parallel supports 7. Disposed between said supports 7 is a cylindrical head 8, which has oppositely disposed trunnions formed integral therewith or otherwise secured thereto, and which trunnions are journaled in the supports 7, so that the head 8 will be free to turn in a horizontal plane. A crank arm 9 is fixed to the bottom trunnion, which has its end connected with the steering gear (not shown) by a link bar 10, in the usual manner. The head is provided with a detachable outer end 11, having an annular inwardly extending flange 12, with a plurality of screw-threaded apertures to receive the ends of locking bolts 13, to secure same to the head. Extending laterally from the center of the head end 11, and preferably formed integral therewith, is an auxiliary axle 14. It will be seen that the detachable outer end or closure 11 can be readily removed by withdrawing the locking bolts 13, and that upon removal of the closure 11 access to the universal coupling can readily be had. It will also be seen that the auxiliary axle 14 can readily be detached from the steering head or casing 8 and from the car; so that if any accident should happen to the auxiliary axle, etc., it can be repaired without removing the entire steering head 8 from its journals on the hollow axle 5.

The wheel hub 15, to which the spokes 16 are attached in the usual manner, has an inner diameter sufficient to leave an intervening space between same and the auxiliary axle 14, between which roller bearings 17 are disposed. A screw plug 18, having a central screw-threaded aperture 19, is screwed over the end of the driven shaft 20, and into the end of the hub 15, to lock the latter to said shaft, a lock pin 21 being passed through the hub and screw plug to hold said parts in locked relation. A screw cap 22 is next screwed upon the driven shaft and hub, as shown, the cap extending over the ends of the locking pin, and preventing accidental displacement thereof, said screw-cap and the nut 23 serving to make the connection between the wheel hub and the driven shaft additionally secure.

The driven shaft 20 extends inwardly to a point near the center of the steering head and its terminal is formed in the shape of a ball 24, anti-friction rollers 25 being disposed between said shaft and the inner side of the auxiliary axle, to properly support the shaft and permit its rotation with the least possible friction.

Pivotally secured to the ball 24 on the driven shaft 20, is a ring, being the inner one of a plurality of rings 25, arranged one within the other and each adjoining pair of rings is pivotally connected to each other in a relatively different degree of angle and radius, said rings swinging on their pivots and permitting the driven shaft, which drives the traction wheel through its connection therewith, to swing with the wheel in steering the same, while at the same time the shaft will during such turning of the wheel positively drive the latter, (see Fig. 2). The power shaft 27, has a yoke 28 mounted at its end, and pivotally connected with the outer ring of the universal coupling at 29. A slot 30 is formed in the inner end of the steering head, through which the driving shaft passes, the slot being elongated so that the steering head may swing without interfering with said shaft. The heads of the pivot pins 31 connecting the rings 25, fit into sockets in the rings, and are screw-threaded a sufficient distance only from the head toward their ends to engage threads in the aperture of the ring in which the head is seated, the ends being smooth where they fit into apertures of the adjoining ring. The rings are slightly rounded on one side, so that one will not interfere with the other as they swing on their pivots in different planes.

From the foregoing it will be seen that power applied to the driving shaft will be transmitted through the universal coupling to the driven shaft, and the traction wheel connected therewith will be positively driven, while at the same time the steering head which supports the auxiliary axle upon which the wheel is mounted, may be swung in the usual manner for steering purposes. The steering head also has the additional function of serving as a housing for the coupling, to prevent sand and grit from coming in contact therewith.

The universal coupling herein shown and described is made the subject matter of a separate application for a patent, filed at the same time herewith, and while the use of said coupling is preferred in connection with the present invention, it is to be understood that we do not limit ourselves to the use of said coupling in connection with the present invention, as it is obvious that any form of universal coupling may be equally as well used without departing from the spirit, or sacrificing any of the advantages of the present invention.

Having thus described our invention, what we claim is:—

1. In a device of the class described, a hollow axle, a cylindrical casing open at one end pivotally supported upon the hollow axle, said casing being composed of a bottom and side walls, with the bottom having a slot therein, a closure for the open end of the casing, an auxiliary axle carried by the closure, a driving shaft mounted in the hollow axle and projecting through the slot in the bottom of the cylindrical casing, a driven shaft mounted in the auxiliary axle, and connecting means between the two shafts.

2. The combination of a hollow axle, a cylindrical casing open at one end pivotally supported upon the hollow axle, a closure for the casing secured at the open end thereof, a hollow auxiliary axle carried by said closure, a flange on the closure spaced from the auxiliary axle but concentric therewith to form an annular recess, a driving shaft mounted within the hollow axle, a driven shaft mounted within the auxiliary axle, means connecting the driving and driven shafts, a wheel having a hub mounted upon the auxiliary axle the inner end of the hub being disposed within the annular recess between the auxiliary axle and the flange, and means to secure the wheel on the auxiliary axle.

3. The combination of a hollow axle, a cylindrical casing open at one end pivotally supported upon the hollow axle, a closure for the open end of the casing, said closure fitting within the open end of the casing, a hollow auxiliary axle carried by said closure, and means to retain the closure within the open end of the cylindrical casing.

In testimony whereof we affix our signatures, in the presence of two witnesses.

CHESTER A. LATHAM.
ORRIN BENTON.

Witnesses:
E. E. ENOCH,
IRA JACKSON.